United States Patent [19]
Venkidu et al.

[11] Patent Number: 5,459,462
[45] Date of Patent: Oct. 17, 1995

[54] KEYBOARD CONTROLLER STATE MACHINE

[75] Inventors: Arockiyaswamy Venkidu, Milpitas; Larry Jones, Palo Alto, both of Calif.

[73] Assignee: OnSpec Electronic, Inc., Santa Clara, Calif.

[21] Appl. No.: 164,326

[22] Filed: Dec. 9, 1993

[51] Int. Cl.[6] .................................................. H03M 11/20
[52] U.S. Cl. .................................. 341/22; 341/20; 341/26
[58] Field of Search ................................. 341/26, 22, 20

[56] References Cited

U.S. PATENT DOCUMENTS

| | | | |
|---|---|---|---|
| 4,644,497 | 2/1987 | Tajima et al. | 364/900 |
| 4,710,869 | 12/1987 | Enokizono | 364/200 |
| 4,942,606 | 7/1990 | Kaiser et al. | 380/4 |
| 5,197,147 | 3/1993 | Long et al. | 395/500 |
| 5,241,464 | 8/1993 | Arai | 395/500 |
| 5,249,287 | 9/1993 | MacDonald et al. | 395/500 |
| 5,261,079 | 11/1993 | Celi, Jr. | 395/500 |
| 5,274,766 | 12/1993 | Long et al. | 395/275 |
| 5,278,958 | 1/1994 | Dewa | 395/275 |
| 5,280,283 | 1/1994 | Raasch et al. | 341/26 |
| 5,339,426 | 8/1994 | Aoshima | 395/700 |

Primary Examiner—John K. Peng
Assistant Examiner—Andrew Hill
Attorney, Agent, or Firm—Stuart T. Auvinen

[57] ABSTRACT

A logic device having a state machine for serially transferring data between an AT-compatible mother board and a keyboard having a microcontroller for scanning the keyboard matrix, without the need for a microcontroller on the mother board. A timer is provided to signal a transmission time-out error, and to indicate the start delay before beginning to transfer data when transmitting to the keyboard. Transmission to the keyboard begins by asserting the clock and serial data bit to the keyboard, and waiting for the start delay to expire. The state machine has a chain of 22 states for transferring an 11-bit data frame, the state transitions occurring after the clock from the keyboard or mouse changes polarity. A time-out error state is entered if a timer indicates that a 32 ms period of time has elapsed. Both transmit and receive operations may time-out with the same delay, and enter the same error state. Finally, after the 11-bit chain is completed, and a stop bit sent or received, the state machine terminates for a transmit, or waits for the end of the stop bit if reading from the keyboard. The state machine may be modified to transfer data with a mouse pointing device as well as a keyboard by using multiplexers to select the clock and data from either the mouse of the keyboard, depending upon the transfer device.

20 Claims, 6 Drawing Sheets

PRIOR ART

KEYBOARD CONTROLLER STATE MACHINE

BACKGROUND OF THE INVENTION—FIELD OF THE INVENTION

This invention relates to Keyboard Controllers, and more particularly to a State Machine for serial communication with a microcontroller-based Keyboard.

BACKGROUND OF THE INVENTION—DESCRIPTION OF THE RELATED ART

The IBM-AT computer, manufactured by International Business Machines, Inc., has become one of the most popular computer architectures. Many manufacturers have designed personal computer systems (PC's) that are compatible with the IBM-AT. Very large volumes of PC hardware have become available at low cost. For example, AT-compatible keyboards can be found for as little as $5.

The AT computer was originally designed to be compatible with many types of keyboards. A very adaptable architecture was designed that included general-purpose microcontrollers in both the keyboard itself and on the system board or mother board. Each microcontroller included a small CPU, read-write memory, and read-only memory for storing instructions, known as firmware. By modifying the firmware, the function performed by the microcontroller, and hence the keyboard subsystem, could be modified. Thus the microcontroller on the mother board could be modified to communicate with various types of keyboards.

Figure 1:
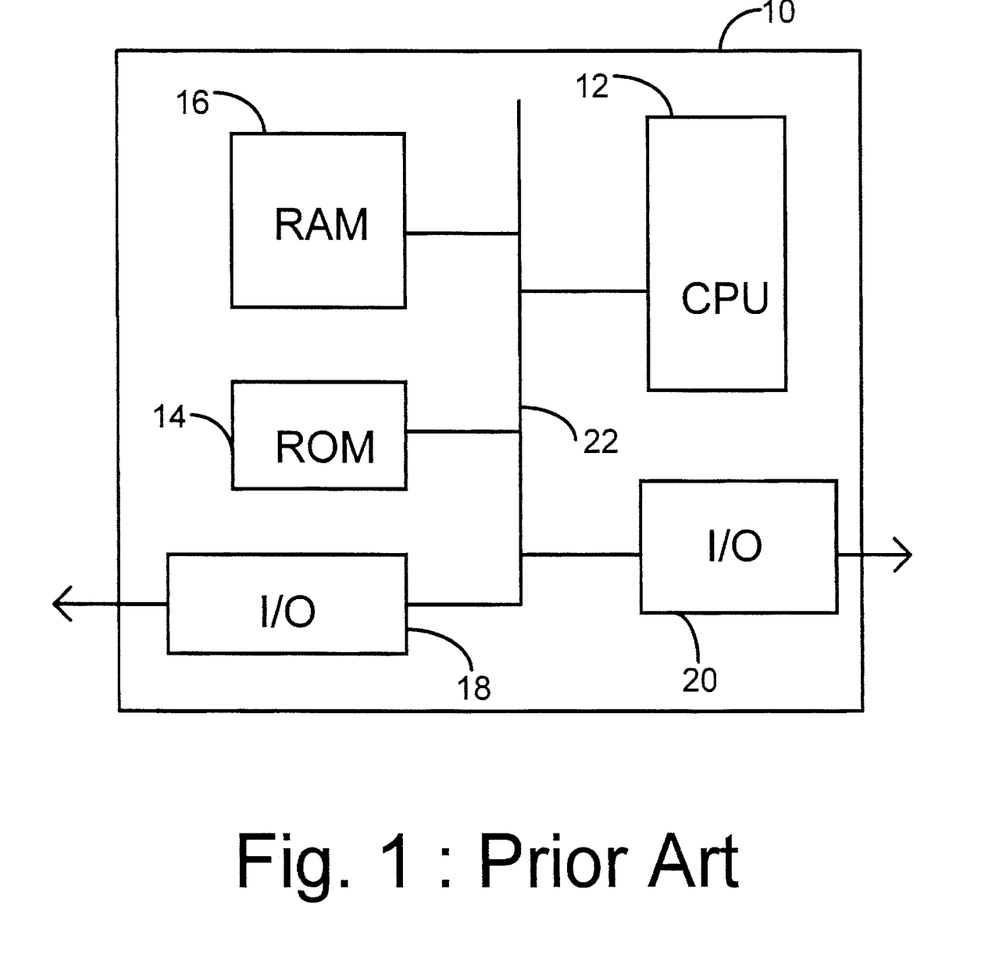
FIG. 1 is a block diagram of a microcontroller.

FIG. 1 shows a typical microcontroller, such as the 8042, originally manufactured by Intel Corporation of Santa Clara, Calif., and used in most AT-compatible keyboard subsystems. Microcontroller chip 10 includes a central processing unit (CPU) 12, which reads instructions from ROM 14, and can read and write data from on-chip RAM 16. Data may also be transferred on and off the microcontroller chip 10 using Input/output ports 18, 20. Internal Bus 22 connects the CPU 12 with RAM 16, ROM 14, and I/O ports 18, 20. Other devices, such as timers, interrupt generators, and direct-memory-access controllers (DMAC) may be included on the microcontroller chip, but are not shown.

Microcontrollers are programmed using well-known techniques. The machine-level instructions, or code, is stored in ROM 14, and may be modified if ROM 14 is programmable, as is EPROM or EEPROM memory. A microcontroller is a self-contained computer and can perform a very wide range of tasks, and can be easily modified. However, microcontrollers are relatively expensive, since a high level of integration is needed to have a CPU, RAM, ROM, and I/O all on the same silicon die. If a simple task is to be performed, then the microcontroller may have many resources that are not used.

Figure 2:
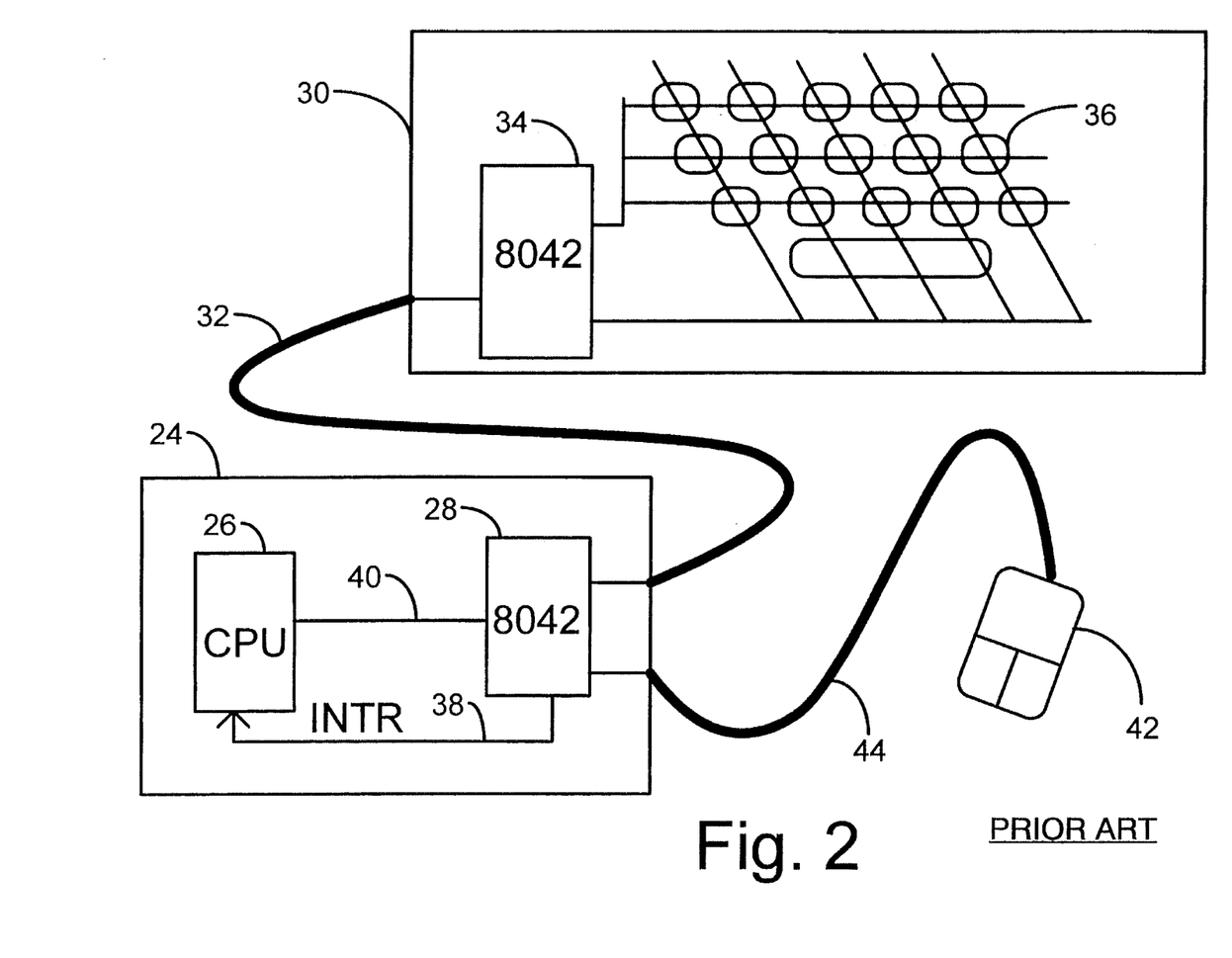
FIG. 2 is a simplified PC system highlighting the keyboard and mouse interface.

FIG. 2 shows a typical keyboard subsystem on an AT-compatible PC. The system or mother board 24 includes the main CPU 26, which may be a 486-type microprocessor manufactured by Intel Corporation, Advanced Micro Devices, or others. CPU 26 communicates with microcontroller 28 on mother board 24 to receive information from the keyboard 30. Microcontroller 28, also known as the keyboard controller, communicates with keyboard 30 through serial cable 32. Serial Cable 32 includes a power supply signal, a ground, and a serial data line and a serial clock. Keyboard enclosure 30 has within it another microcontroller 34. Microcontroller 34 scans key matrix 36, and signals the CPU 26 when a key switch has been pressed or released. When key activity is detected by microcontroller 34, an 8-bit scan code representing the particular key pressed or released is generated and sent serially over cable 32 to microcontroller 28, which converts the scan code to a key code, typically an 8-bit byte of data. An interrupt 38 is generated by microcontroller 28 to alert CPU 26 that keyboard activity has occurred. CPU 26 then reads a data I/O port on microcontroller 28 containing the key code indicating the key changed. Data is transferred from microcontroller 28 over data bus 40. Many other devices, such as RAM and ROM, are usually connected to system data bus 40, and data bus 40 itself is usually divided up into several segments (not shown).

In AT-compatible PC's, both microcontroller 28 and microcontroller 34 are 8042-series devices originally manufactured by Intel Corporation. Thus a typical PC has at least 2 microcontrollers: a microcontroller inside the keyboard for scanning the keyboard matrix, and a second microcontroller, called the keyboard controller, on the mother board. The two microcontrollers communicate with each other over a serial data link between them, the serial link including a cable between the keyboard and the main computer case.

Since the 8042 is a general-purpose device, other miscellaneous system functions are performed by the keyboard controller. Most AT systems use the 8042 for generating a "hot reset" and for generating a "gate A20" signal. Unused bits in the I/O or output port are used as these two signals. Writing a value to the output port will cause these signals to change to the new value that the host or system CPU writes to the output port. Both of these signals are very important for AT-compatibility. Hot reset is used for resetting the CPU when the processor is changed from "protected mode" to "real mode". Hot reset will only reset the CPU, and not the entire system. Hot reset is necessary because of certain compatibility issues with older software and CPU's. Writing the data "FE" to command port 64 Hex causes a subroutine to be executed in the 8042 that will pulse the hot reset line for about 6 microseconds. Typically hot reset is implemented with OR gates on the system board that combine reset signals from several sources; for example the reset button on the front of the computer case, reset from the power supply, and other sources besides the hot reset from the keyboard controller.

The gate A20 signal is used for compatibility with programs written for the Intel 8088 CPU, which could only address 1 megabyte of memory. When addresses greater than 1 Meg were accessed, the CPU would "wrap" around to address 0, since there was no address bit A20 or greater. Thus an access to address 1 Meg+ 5 would wrap around to address 5. Current AT-PC's emulate this behavior by forcing the A20 address line low with simple gating logic on the system mother board if the Gate A20 signal is active. The gating logic can be as simple as an AND gate on the CPU's A20 address line. A20 from the CPU is ANDed with GATEA20 from the 8042 to produce the A20 to the memory and the rest of the system. Thus when the 8042 asserts GATEA20 low, address 20 is forced low to the rest of the system.

Another bit in the 8042's I/O output port is used to drive the Gate A20 signal. The system CPU merely writes a new value to the I/O port to update Gate A20. However, since the I/O port is a resource under the control of the 8042's internal CPU, a small subroutine must be executed to transfer the data from the host I/O port (18 of FIG. 1) to the output port (20 of FIG. 1). This subroutine is located in the 8042 microcontroller's ROM 14, and requires the use of microcontroller resources such as the internal bus 22 and the internal CPU 12. Thus even the simple writing of a bit to an output port of the 8042 requires the execution of a microprogram within the 8042 microcontroller.

Recently, pointing devices such as a "mouse" have gained widespread use with PC's. The keyboard interface may be modified to communicate with the mouse 42 over a serial mouse cable 44, using I/O ports of microcontroller 28. Mouse cable 44 includes power, ground, a clock, and a serial data line. Mouse 42 generates mouse codes to indicate direction and degree of movement of the pointing device, or to indicate mouse button presses. These mouse codes are also serialized and sent to microcontroller 28, which may convert the codes and generate an interrupt 38 to the CPU 26. Alternately, another interrupt line may be used (not shown).

While the dual-microcontroller interface used on AT-compatibles is very flexible, the PC industry has standardized on a single basic keyboard type, the standard 101-key. Thus the flexibility is not usually needed. While the 8042 microcontroller is inexpensive, its cost is still greater than the cost of a simple logic device. In addition, microcontrollers, or any programmed, instruction-based machine suffers a performance penalty from overhead inherent in a micro-programmed machine: fetching and decoding instructions may result in many additional memory references. As an example, reading the serial data from the I/O port will require first reading an instruction from the ROM, decoding this instruction, which may be an instruction to read the I/O port and place the data in a register in the CPU. The data transfer next takes place. Then a second instruction is read from ROM and decoded; this instruction may shift the data bit received and merge it with other bits in another CPU register. The next instruction fetched might again read the I/O port, and the following instruction compares the serial clock bit from the I/O port to see if the clock has changed yet. A loop might be entered to wait for the clock to toggle. Then another instruction is fetched from ROM, causing the CPU to again read the I/O port. The next instruction might shift the data bit and merge with the other data. Finally, when all serial data bits have been received, the data is transferred from the CPU register to the RAM. Another instruction would generate an interrupt to the host CPU.

The net result is many additional memory references to read or fetch instructions from ROM, resulting in additional overhead, even for a relatively simple task. Data is transferred between temporary registers in the CPU core and the RAM and I/O ports. Every transfer or operation requires an instruction fetch. All these extra fetches use up bus bandwidth and can result in decreased performance.

The performance decrease is especially troublesome for the Gate A20 and Hot reset logic. Although the 8042 merely has to update values in an output port, or pulse an output bit in the case of the Hot Reset, this requires that a micro-program be executed. Again this results in additional instruction fetching and unnecessary register transfers. Even more of a concern is when serial communication is being performed with the keyboard or mouse. Since the serial communication is controlled by a subroutine being executed in the microcontroller's CPU, no other functions can be performed while the serial transfer is in progress. Updating Gate A20 or the Hot Reset must wait for the relatively slow serial transfer to complete. Thus when contention for the microcontroller's resources occur, the hot reset and Gate A20 functions may be very slow. Thus can be a critical performance issue since Hot reset occurs often when certain programs use extended memory. This has been such a problem that some manufactures have emulated the Gate A20 and Hot reset functions in DRAM controllers to avoid the slow delays and contentions. However, this redundancy results in additional gating logic because the Gate A20 and Hot Reset signals from the 8042 must still be able to function.

While general-purpose microcontrollers are flexible, they not only suffer performance penalties inherent in micro-programmed machines, but also contain many resources such as instruction fetch and decode logic, ROM and RAM, that may not be fully utilized or even necessary for the function being performed. Since the keyboard interface on AT-compatible PC's perform relatively simple tasks, what is desired is to implement the serial communication functions without using a micro-programmed machine, thereby reducing cost and increasing performance.

SUMMARY OF THE INVENTION

A logic device implements the critical communication functions of the keyboard interface using a state machine. The state machine transmits an 11-bit packet over a clocked serial line to a keyboard that has its own microcontroller for scanning the keyboard matrix. The microcontroller on the keyboard will interpret instructions transmitted over the serial line, and will send scan codes back over the serial line when a key is pressed or released. The state machine will receive a clock from the microcontroller, assemble the serial data, and convert the scan code into a key code that can be recognized by an AT-PC host system. The state machine has a timer based on an independent, internal clock for setting a start transmission delay to allow the microcontroller to respond by starting to clock the data out over the serial line, and for setting a time-out delay to set an error code in a status register should the transmission not end within the delay period. A separate command logic block is provided for transferring data with the system CPU and updating Gate A20 and Hot Reset in the output port. Since the state machine operates independently of the command logic, serial communication and updating of Gate A20 and Hot reset can occur simultaneously with no performance penalty.

DETAILED DESCRIPTION

The microcontroller 28 on the system mother board is replaced with a logic device that emulates the functions programmed into the 8042 microcontroller. The device must behave in the same way that the microcontroller does in order for compatibility with the PC-AT architecture. The microcontroller inside the keyboard scans the keyboard matrix and sends scan codes to the keyboard controller logic device. Scan codes received from the keyboard must be converted to key codes for the CPU to read. However, rather than using a micro-program to convert the scan codes to key codes, hard-wired combinatorial logic performs the conversion. The logic implements the conversion as simple combinatorial terms. A few examples of conversions between scan codes and key codes are shown in the following table 1.

TABLE 1

Scan Code Conversion Examples

| keyboard Scan Code | Key | System Key Code |
|---|---|---|
| 00 |  | FF |
| 76 | 90 | 01 |
| 16 | 2 | 02 |
| 1E | 3 | 03 |
| 26 | 4 | 04 |
| 25 | 5 | 05 |
| 2E | 6 | 06 |
| 36 | 7 | 07 |
| 3D | 8 | 08 |
| 3E | 9 | 09 |
| 46 | 10 | 0A |
| 45 | 11 | 0B |
| 4E | 12 | 0C |
| 55 | 13 | 0D |

Data may be read from the keyboard or transmitted to the keyboard. Data is sent as an 8-bit serial byte, and an odd parity bit is appended after the 8 data bits. A start and a stop bit are also included. Thus data is sent in an 11-bit packet or frame. Data is synchronized by a serial clock supplied by the keyboard or mouse. If a parity error is detected, a resend command is sent to the keyboard.

Figure 3:
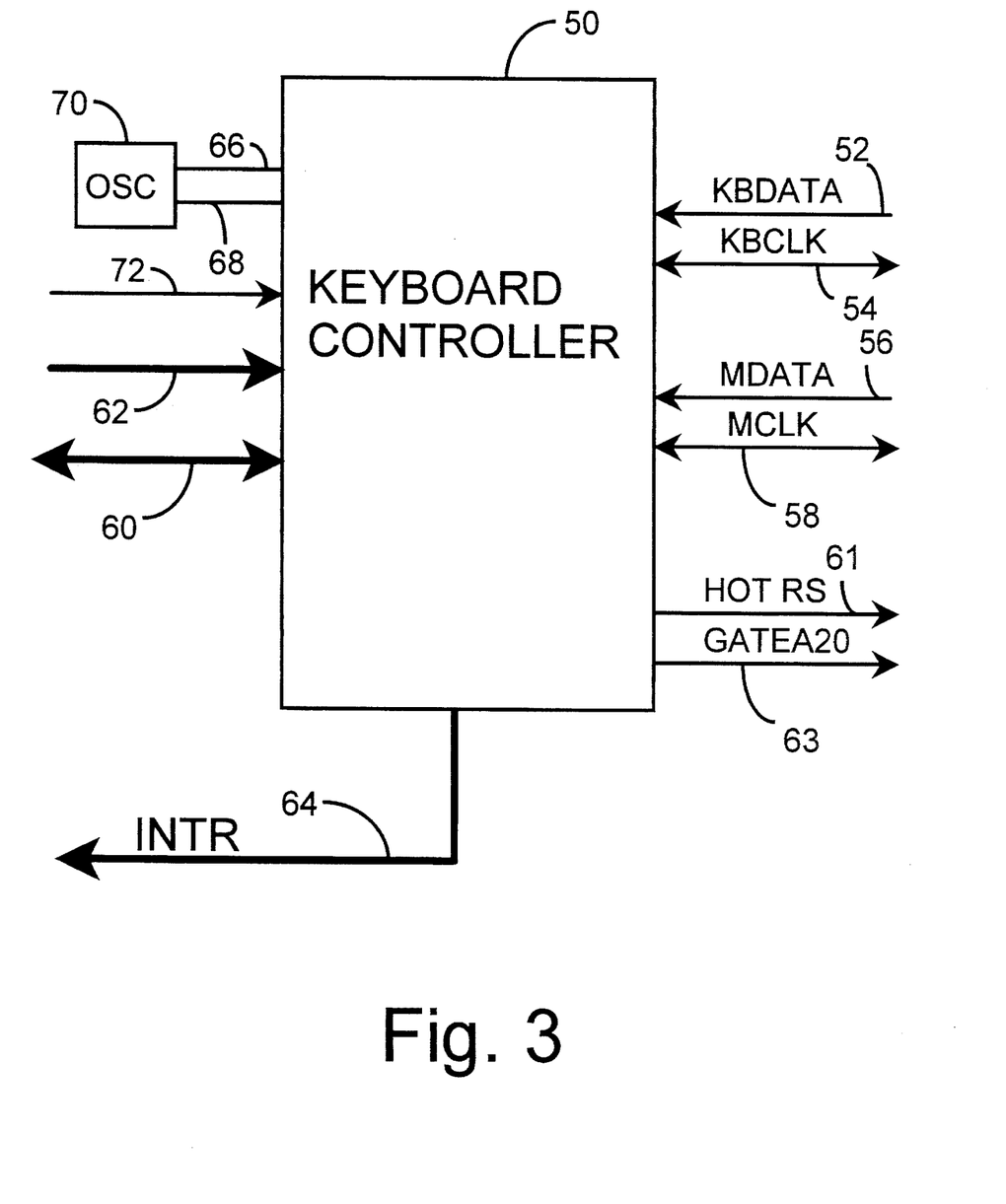
FIG. 3 is a block diagram of the inputs and outputs to the Keyboard Controller Logic Device.

FIG. 3 is a block diagram of the inputs and outputs to the Keyboard Controller Logic Device. The keyboard controller 50 receives serial data from the microcontroller inside the keyboard over keyboard serial data line 52. A serial clock 54 is generated by the microcontroller inside the keyboard for synchronization of the data. Serial clock 54 is an open-collector signal, a signal that can be driven low by both ends of the serial link, but the clock cannot be driven high except for a short period of time. A pull-up resistor holds the clock line high when neither device is driving the clock line. Thus bidirectional communication is possible over the clock line. While the microcontroller inside the keyboard normally drives the clock line, by driving the line low for the low portion of the clock period and by not driving it for the high portion of the clock period, the keyboard controller may use the clock line to signal the start of transmission by asserting the clock low when it would otherwise be high. Communication from a pointing device, such as a mouse, is provided for by mouse serial data line 56, which is synchronized by a mouse clock 58 generated by the mouse device.

The interface to the host, or mother board. CPU, includes a parallel data bus 60, which is an 8-bit extension bus, or XD bus, on many PC's. Control lines 62 include a read strobe, a write strobe, a chip-select signal, and one or more address bits. Thus control lines 62 may be used to write a byte of data into the keyboard controller, or to read data from the keyboard controller, such as key codes. The address line may be used to select between a command register and a data register inside the keyboard controller. Usually this is a low-order address bit. In the AT architecture, I/O address 64 Hex is the command port, while address 60 Hex is the data port. Thus the chip select signal would be active when the CPU addresses I/O address 60 or 64, while address bit A2, the third LSB, would select between address 60 and 64.

When a scan code is received and converted to a key code, an interrupt is signaled over lines 64 to alert the CPU to read the data port inside the keyboard controller 50. When the data port is read the interrupt will be cleared, or turned of, by the keyboard controller. A crystal oscillator 70 connects to inputs 66, 68, which are used by the keyboard controller to generate an internal clock signal. A reset line 72 will reset the keyboard controller during system power-up. Outputs Gate A20, 63 and Hot Reset 61 from the output port are also provided to the host system.

Figure 4:
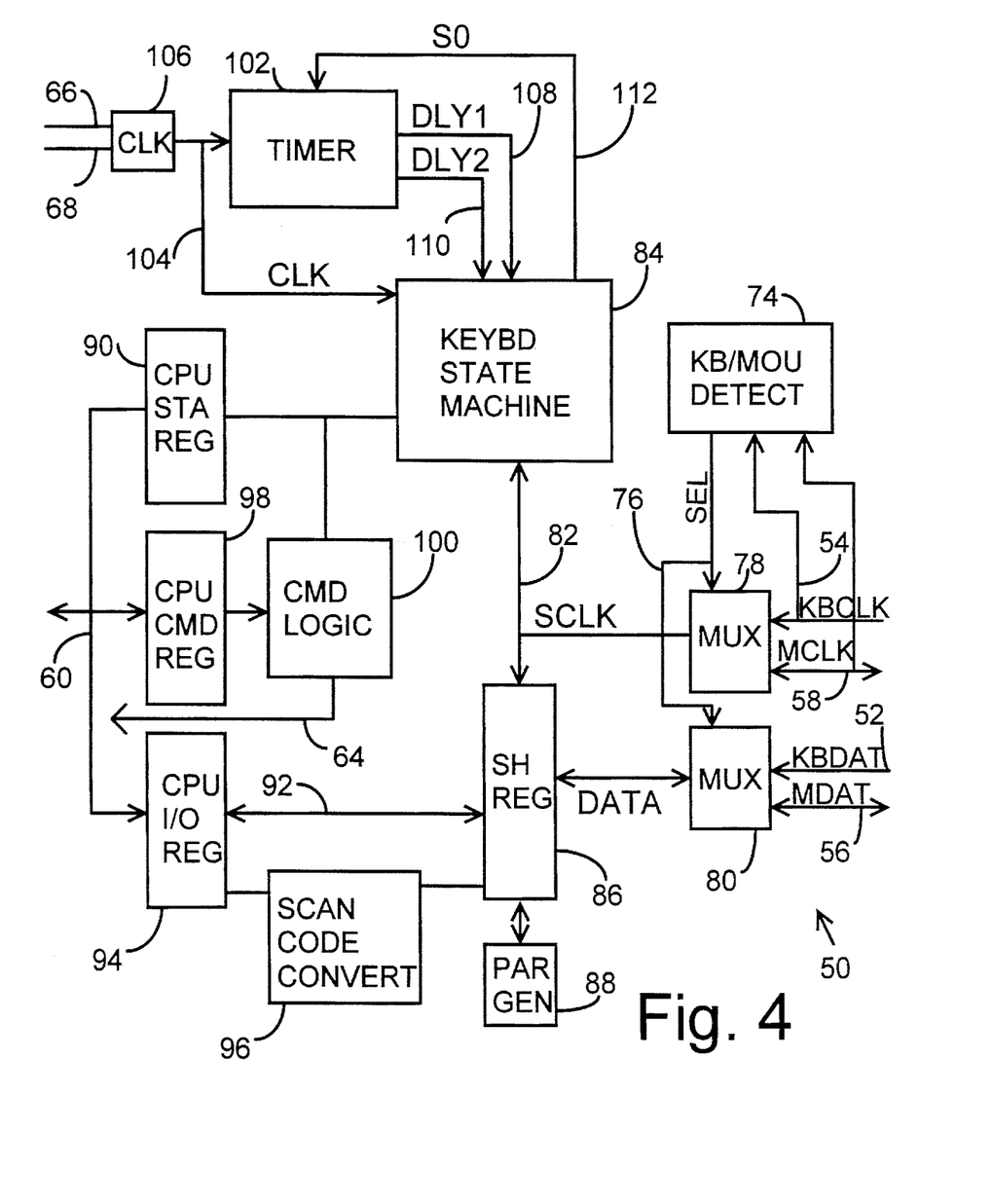
FIG. 4 is an internal block diagram of the keyboard controller logic device.

FIG. 4 is an internal block diagram of the keyboard controller 50. Mouse/Keyboard detect circuit 74 watches clocks 54, 58 from the keyboard and mouse to detect a start of a transmission from either device. A Keyboard/mouse select signal 76 is generated by detect circuit 74, which causes multiplexers 78, 80 to select between the clock and data from either the mouse or keyboard. The output of multiplexer, or mux 78 is a serial clock signal (SCLK) 82, from either the mouse or the keyboard. This clock signal 82 is sent to the keyboard state machine 84 and to shift register 86. Shift register 86 accepts the data bit output from mux 80, from either the mouse or the keyboard. The shift register assembles the data from the mouse or keyboard one bit at a time. Serial clock 82 causes the shift register to shift down one bit. Data may be transferred bidirectionally through mux 80 and shift register 86 or with additional logic (not shown) to allow for both transmission to and reception from the mouse or keyboard.

Parity checker/generator 88 connects with shift register 86 to generate a parity bit for the 8 data bits when a transmission is to occur, and checks the parity when a reception from the mouse or keyboard completes. Odd parity, meaning that the parity bit is a "1" if an odd number of "1"s is counted in the data byte, is used on AT keyboard subsystems. If a parity error is detected, an error bit in status register 90 is set, which may then be read by the CPU.

An 8-bit byte of data may be transferred over internal bus 92 to data I/O port 94, which may be read or written by the CPU. Scan code conversion logic 96 may convert the data byte on bus 92, from shift register 86, which normally contains a scan code from the keyboard. Conversion logic 96 will convert the scan code to a key code before loading data port 94. Scan code logic 96 is implemented using combinatorial logic gates.

The CPU may also read status and error information from status register or port 90, or the CPU may write a command to command port 98. Both ports 90, 98 connect to command control logic 100. Command logic 100 can signal an interrupt over control lines 64 to the CPU, and will reset the interrupt when the CPU loads data port 94. Command logic 100 instructs keyboard state machine 84 to begin transmission, while keyboard state machine 84 may signal a time-out error to command logic 100 if a preset delay time has been exceeded. Command logic 100 may also force the CPU to reset by pulsing a hot reset signal in control signals 64, or may force address bit A20 low to emulate AT compatibility, also with a signal "GATEA20" contained in control signals 64.

Since command logic 100 is separate from state machine 84, serial communication can occur controlled by state machine 84 while the CPU accesses CPU ports 90, 94, 98 under the control of command logic 100. Thus the CPU can access the ports of the keyboard controller while serial communication is occurring, which is not possible in a simple microcontroller where all the resources must be used for serial communication. This is especially advantageous when additional logic (not shown), such as address A20 gating and soft reset, needed for compatibility and for protected mode switching on PC's, are integrated in the keyboard controller. In a standard 8042 device these functions would have to wait for the completion of the serial communication; on the keyboard controller logic device they can occur simultaneously with serial communication.

Timer 102 receives clock 104, which is generated from the clock generator 106 from crystal oscillator inputs 66, 68. Clock 104 is also inputted to keyboard state machine 84, for sequencing between states. Timer 102 generates a start transmission delay signal, DLY1 108, and a time-out delay DLY2 110. Timer receives signal 112 from keyboard state machine 84, signal 112 indicating that state S0, the first or idle state in the keyboard state machine, is active. This signal 112 resets the timer 102. Thus timer 102 is reset when keyboard state machine 84 is idle or when it completes a data transfer. Timer 102 is implemented as a 14-bit ripple-counter, which is cleared by the output of a D-type Flip-Flop that is clocked by the same clock 104 as the timer and state machine. Since the D-input of the Flip-Flop is state S0, signal 112, the ripple counter is cleared or reset one clock after the idle state is entered. DLY1 108, the transmission start delay, is the ANDing of output bits from the counter, chosen for a delay of about 1280 clock 104 periods, which for a 100 ns input clock is 128 microseconds (us). DLY2 110, the time-out delay, is similarly chosen to be 32 milliseconds (ms). The AT specification uses several different delay periods for time-out errors, from 2 ms for completion of reading data from the keyboard, 15 ms for the keyboard to begin clocking data out of the logic keyboard controller, to 25 ms for the keyboard to respond overall. These specified delays were all combined into the 32 ms time-out delay of the keyboard controller logic device. This gives the keyboard additional time to respond yet will still signal an error for faulty or disconnected keyboards.

Keyboard/mouse detect circuit 74 operates in the following manner. Signals STARTK and STARTM are generated during idle state S0 when the following logic equations are true:

$$\begin{aligned} STARTK &= S0 * KCLOCK * -KDATA \\ &+ S0 * KCLOCK * KDATA * XKEY \\ STARTM &= S0 * MCLOCK * -MDATA \\ &+ S0 * MCLOCK * MDATA * XMOUSE \end{aligned}$$

XKEY and XMOUSE are signals generated by command logic block 100 of FIG. 4 to indicate that a command from the CPU to transmit a byte to the keyboard or mouse, respectively, has been received. The clock signal from the keyboard or mouse must be in the high state, otherwise the state machine will wait for the next serial clock transition to being, when these logic equations will become true. The serial data line, whether from the keyboard or mouse, must be in the high or inactive state before the keyboard controller can safely begin transmission, indicating that the keyboard is not beginning a new transmission with a start bit. However, if a start bit, a low, or logic "0", is seen on either serial data line, it indicates that the keyboard or mouse wishes to begin transmitting to the keyboard controller. Thus the keyboard controller should begin reception from the device asserting the start bit.

Signals STARTK and STARTM will be latched on the next oscillator clock 104 edge, when the state machine transitions from the idle state S0 into an active state. The latched signals are used for the mux select signal 76 of FIG. 4. In the preferred embodiment, the latched keyboard signal is used as the Mux select, giving priority to the keyboard if simultaneous start bits are received from both the keyboard and mouse.

Figure 5:
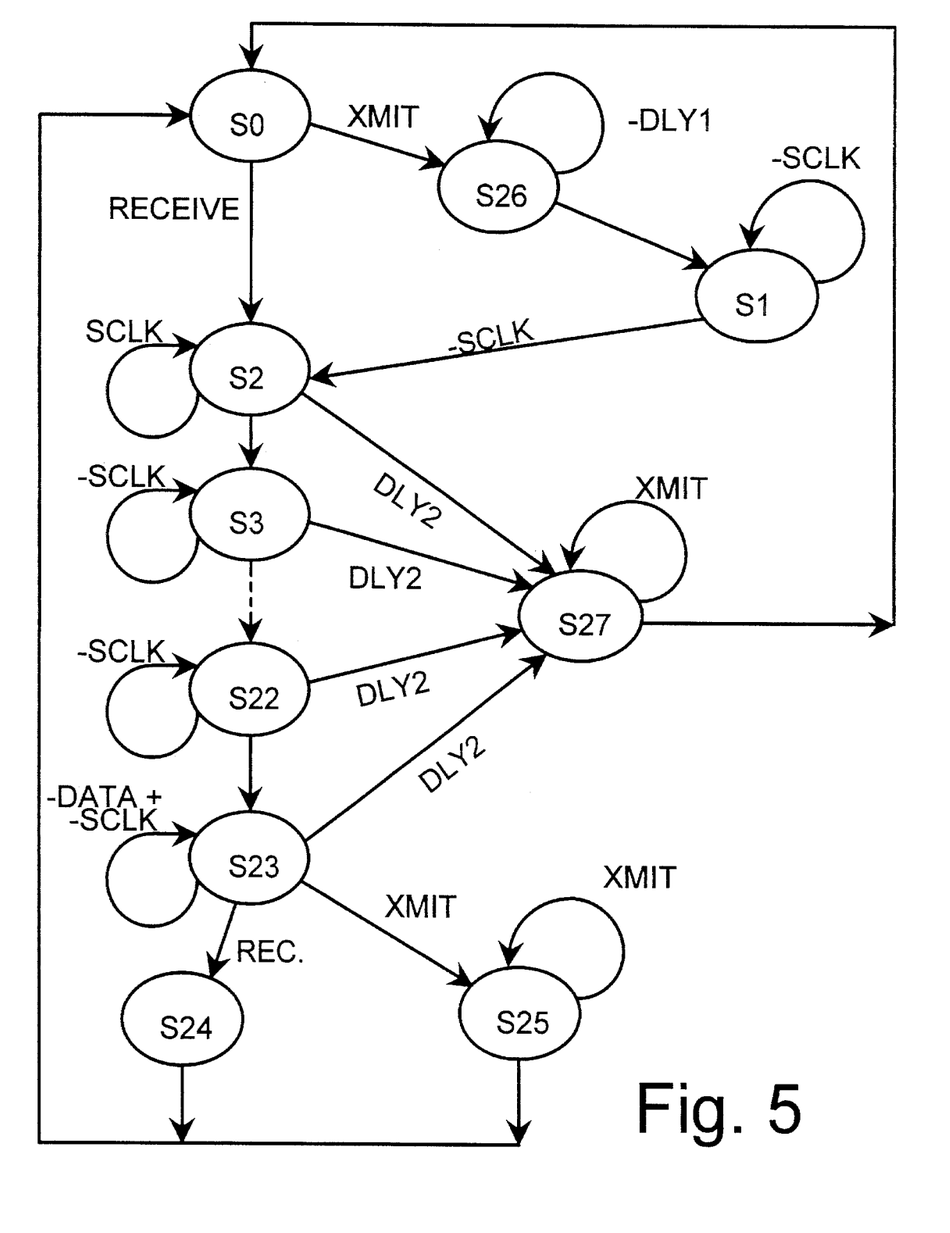
FIG. 5 is a diagram of the state machine for serial communication with the keyboard and mouse.

FIG. 5 shows a state diagram for keyboard state machine 84. When reset occurs (not shown), state S0 becomes active. When a reception from the keyboard or mouse is signaled by keyboard/mouse detect circuit 74 of FIG. 4, the state machine transitions to state S2 on the next rising edge of clock 104 from the external crystal oscillator. A reception is indicated by the keyboard or mouse clock being high, the serial data bit being low, which is a start bit, and state S0 being active. State S2 will remain active until the serial clock from the mouse or keyboard goes low. Then on the next state machine clock 104 rising edge the state machine will transition to S3, where the state machine will wait for the mouse or keyboard serial clock to transition high. Since the mouse and keyboard clocks, having a period of 10's of microseconds, but varying somewhat between keyboards, are much slower than the internal clock 104, which preferably has a period of 100 nanoseconds, all keyboard/mouse clock edges will be seen by the keyboard state machine.

A chain of 22 data transfer states will be sequenced through, starting from state S2, S3, through state S23. States S4 through S21 are not shown explicitly in FIG. 5 due to space limitations. Transitions into even-numbered states will occur on the internal clock edge after the serial clock SCLK becomes high, while transitions into odd numbered states will occur on the internal clock edge after the serial clock becomes low, -SCLK. Thus control will pass down through the chain of states alternating with the serial clock transitions, but synchronized to the internal clock. In the preferred embodiment, low-to-high transitions of the internal clock are used for all state machine transitions, and the state machine is implemented with D-type flip-flops, while the 28 states are encoded into 5 flip-flops with 3:8 encoders and decoders. Thus 32 states could be encoded with this scheme.

Data is received, or latched into shift register 86 of FIG. 4, during the odd states, when the external serial clock is low. Thus the first bit, or start bit, is received during state S3, while the next bit, the first data bit, is received and latched during state S5. The last data bit is received in state S19, the parity bit received in state S21, while the stop bit received in state S23. Note that the start and stop bits do not need to be latched into the shift register, nor does the parity bit, which only needs to be checked and compared against the generated parity.

Upon completion of the chain of states, the state machine will remain in state S23 when receiving from the keyboard or mouse, until the stop bit is completed. Since both the start and stop bits are low, the state machine must see the serial data line in the high state before exiting, otherwise the low stop bit could be mistakenly seen as a start bit, when in fact it was just a stop bit that stayed low too long. Once the stop bit is over, and a high seen on the serial data line, then the state machine can transition to the final state, S24, provided the serial clock is high. Otherwise the state machine will continue pausing in state S23 until the serial clock and serial data bit are both high.

When a command is received from the host CPU, which places the command in CPU command register 98 of FIG. 4, the command control block 100 will decode the instruction and activate either signal XKEY or XMOUSE to indicate to the state machine to start a transmission to the external keyboard or mouse. Data from the CPU will be transferred from CPU I/O port 94 to shift register 86, which will convert the parallel data byte to a serial bit stream under control of the state machine and the serial clock. Keyboard/ mouse detect circuit 74 of FIG. 4 will set the serial data path from the shift register 86 to the mouse or keyboard serial data input/output as indicated by the type of transfer, mouse or keyboard.

The state machine will transition from the idle state S0 to the first transmit state, S26, when the serial clock is in the high state and the serial data line is high, indicating that the external mouse or keyboard is not transmitting. The serial clock is normally high and not pulsing when no transfer is in progress. The keyboard controller will drive the serial data line low, a start bit, indicating to the external device to start reception. The keyboard controller will also drive the serial clock line low during state S26, but will stop driving the serial clock after DLY1 has expired and the state machine has transitioned to state S1, when the external keyboard or mouse will drive the serial clock for the remainder of the transmission. Since the serial clock is driven with open-collector drivers, when the clock is in the high state neither the keyboard controller nor the microcontroller inside the keyboard is driving the clock. Thus the keyboard controller can safely drive the high serial clock low, overpowering the pull-up resistor on the line. The microcontroller inside the keyboard or the mouse detects this low clock when it should be high as a start transmit signal, together with the low data bit.

The state machine will wait in state S26 until the transmit start delay, DLY1 from the timer, has elapsed, preferably 128 us. Then the state machine will transition to state S1, stop driving the serial clock line, and will wait for the serial clock from the external device to go high again. The state machine will then transition to state S2 on the next rising edge of clock 104 from the external crystal oscillator.

The chain of states is again entered with state S2, and will continue on alternate external serial clock edges to state S23, while the keyboard controller will transmit 11 bits over the serial data line, first the start bit during states S26 and S1, then the first data bit in S3. The shift register will output the correct data bit during states S3 to S17, when the last or 8th data bit is transmitted. The parity generator will output the parity for transmission during state S19, while the low stop bit will be transmitted during state S21. Finally, state S25 will be entered once the serial clock goes high, and the serial data line driven high, to indicate that transmission is over. State S25 will remain active until the command logic 100 of FIG. 4 de-asserts the transmit command signal, XKEY or XMOUSE. Then the state machine will return to the idle state S0.

Another feature of the state machine is the ability to signal an error if transmission or reception is too slow, or even halted, as can occur with a faulty or disconnected cable. If the timer 102 signals that the 32 ms delay DLY2 110 has been exceeded, then the state machine will jump into state S27, the time-out state. The time-out state can be entered from any of the 22 states in the chain of states, but not from any other states. State S27 is used to set the time-out error bit in CPU status register 90, which can be read by the CPU. State S27 will transition to the idle state on the next internal clock edge if a reception is in progress, while if a transmission is occurring, state S27 will remain active until command logic 100 de-asserts the XKEY or XMOUSE transmit command signal. The signal XMIT is (XKEY OR XMOUSE).

Figure 6:
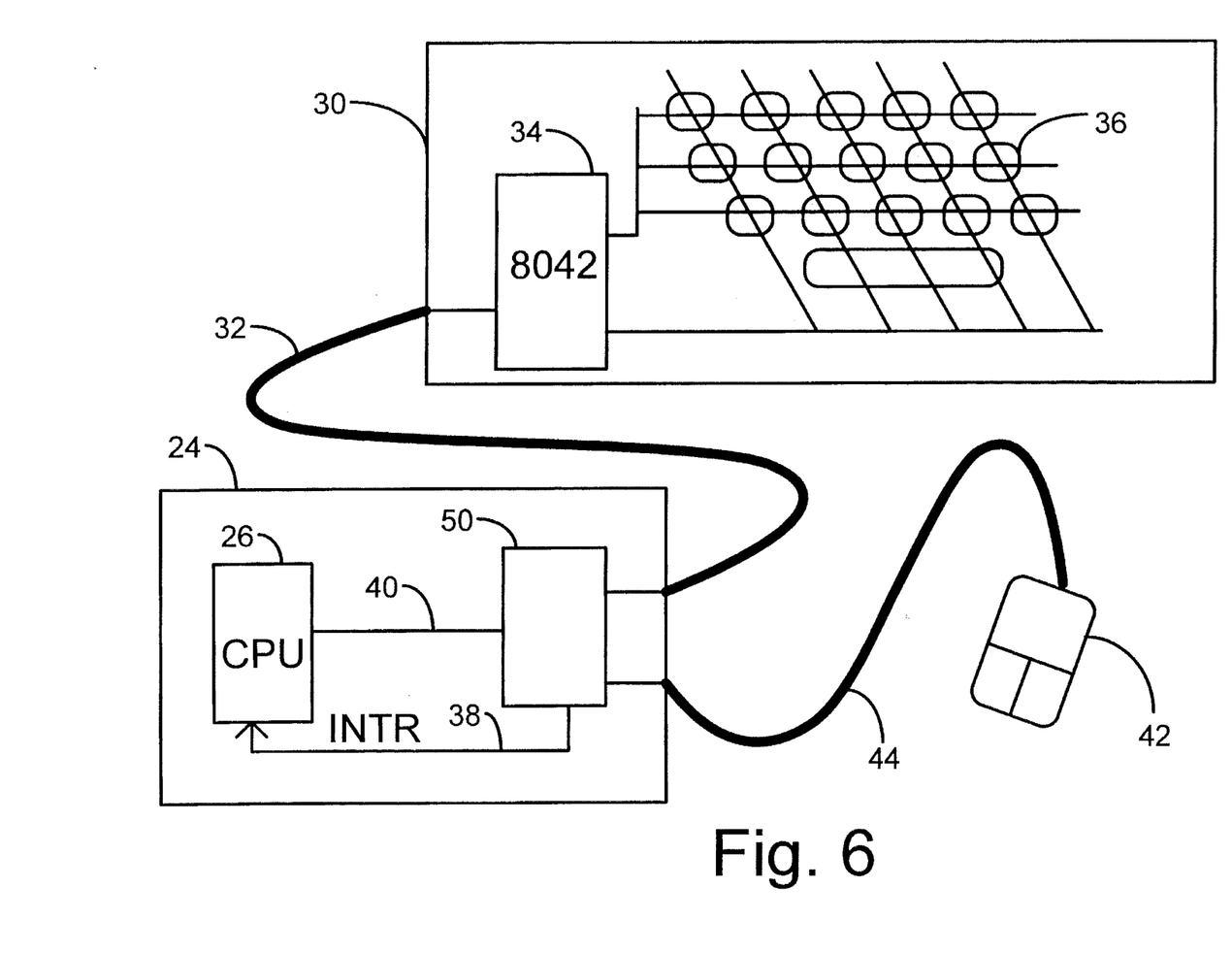
FIG. 6 is a diagram of a simplified PC system's keyboard and mouse interface using the keyboard controller logic device of FIG. 4.

FIG. 6 is a diagram of a simplified PC system's keyboard ad mouse interface using the keyboard controller logic device 50 of FIG. 4. Other reference numbers are the same as in FIG. 2, showing similar elements.

ALTERNATE EMBODIMENTS

Several other embodiments are contemplated by the inventors. For example, the state machine could use different time-out or start delays from the timer. A time-out delay longer that the delay specified in the AT specification was chosen in the preferred embodiment. The chain of states could be encoded into a counter that the main o keyboard controller state machine triggers. The time-out state could be entered from additional states besides just the chain of states. Of course, additional states could be inserted in the machine.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A state machine for controlling the transfer of information in a serial fashion between a system mother board and a keyboard, the keyboard having a microcontroller for scanning the keyboard for pressed or released keys, the state machine comprising:

a first clock input, for controlling the sequencing of states in the state machine;

a timer, responsive to the first clock, for indicating a start delay for transmission and a time-out delay;

a serial clock terminal, the serial clock generated by the keyboard, except when the state machine signals the start of transmission to the keyboard, the serial clock for synchronizing the transfer of data between the mother board and the keyboard;

means for sequencing through a plurality of states for serially transferring data bits, successive states being entered in sequence when the serial clock signal from the keyboard changes polarity, one bit of data being transferred during each serial clock period;

transfer time-out state means, entered from the means for sequencing through the plurality of states when the timer signals a time-out delay; and transmit start state means, for asserting the serial clock low to signal the keyboard to begin receiving serial data, the transmit start state means being active until the transmission start delay has been signaled by the timer;

whereby data is transferred between the keyboard and the system mother board under the control of the state machine, without the need for a microcontroller on the mother board.

2. The state machine of claim 1 wherein the last state in the means for sequencing through the plurality of states comprises an end of receive state means, for ensuring that a stop bit has finished transmission, the end of receive state means remaining active until the stop bit has ended.

3. The state machine of claim 1 wherein the start delay for transmission is about 128 microseconds.

4. The state machine of claim 1 wherein the time-out delay is about 32 milliseconds.

5. The state machine of claim 1 wherein means for sequencing through the plurality of states comprises 22 state means for transferring an 11-bit frame, the frame including a start bit, 8 data bits, an odd parity bit, and a stop bit.

6. A keyboard subsystem for communicating with a CPU in a system unit, the keyboard subsystem comprising:

a keyboard enclosure, having a key matrix with a plurality of key switches;

a microcontroller, disposed within the enclosure, for scanning the key matrix for pressed or released keys, the microcontroller generating a scan code to identify the key pressed or released;

a keyboard controller logic device, for serially transferring data with the microcontroller within the keyboard enclosure, the keyboard controller including:

detect means for detecting a start bit from the keyboard;

first register means for storing a command from the CPU;

command logic means, coupled to the first register means, for communicating with the CPU and initiating a transmission of data to the keyboard;

a timer, for signaling a first delay and a second delay;

state machine means, responsive to the command logic means and the detect means, for controlling the transfer of data between the keyboard controller and the keyboard, the state machine means signaling a time-out error when the timer indicates that the second delay has elapsed, the state machine means asserting a start bit during the first delay period; and a serial link between the microcontroller within the keyboard enclosure and the keyboard controller logic device, the link including a serial clock line for synchronizing data transfer, a serial data line for transfer of one data bit per serial clock period, and power and ground for energizing the microcontroller within the keyboard enclosure;

whereby data is transferred with the keyboard without a micro-programmed keyboard controller in the system unit.

7. The keyboard subsystem of claim 6 further comprising:

second register means for storing key codes, the second register means being read by the CPU;

shift register means, responsive to the state machine means, for assembling the serial data bits from the keyboard; and scan code conversion logic, coupled between the shift register means and the second register means, for converting the scan code from the keyboard to a key code recognizable by the CPU.

8. The keyboard subsystem of claim 6 wherein the keyboard controller logic device further comprises:

a GateA20 output, responsive to the command logic means, for forcing a 20th Address line from the CPU low; and a Hot Reset output, responsive to the command logic means, for resetting only the CPU, the Hot Reset output pulsing in response to a specific command written by the CPU into the first register means.

9. The keyboard subsystem of claim 6 wherein the state machine means sequences through a series of states including:

an idle state, entered during a reset and upon completion of all serial transfers;

a first start-transmit state, entered from the idle state when the command logic means signals for the state machine means to transmit to the keyboard, the keyboard controller logic device transmitting a start bit when the first start-transmit state is active, the first start state remaining active until the first delay is signaled by the timer;

a second start-transmit state, entered from the first transmit-start state when the timer signals the completion of the first delay, the second start state ending when the serial clock is asserted high from the keyboard;

a chain of states, entered from the idle state when receiving from the keyboard, when the detect means detects a start bit from the keyboard, and also entered from the second start-transmit state when transmitting to the keyboard, after the microcontroller within the keyboard drives the serial clock high, the chain of states having a sequential series of states, each state entered from the previous state after the serial clock changes polarity, one bit of data being transferred for every serial clock period; and an error state, entered from any state in the chain of states when the timer signals that the second delay has elapsed, the keyboard controller logic device setting a time-out error bit when the error state is entered.

10. The keyboard subsystem of claim 9 wherein the keyboard controller logic device also asserts the serial clock low when transmitting the start bit during the first start-transmit state, and wherein the serial clock line is driven by an open-collector bidirectional terminal from the keyboard controller logic device, the first start-transmit state being entered when the serial clock from the keyboard is high and not being driven by the keyboard.

11. The keyboard subsystem of claim 9 wherein the last state in the chain of states comprises an end of receive state, for ensuring that a stop bit has finished transmission, the end of receive state remaining active until the stop bit has ended.

12. The keyboard subsystem of claim 9 wherein the first delay for the start of transmission is about 128 microseconds and the second delay for time-out is about 32 milliseconds.

13. The keyboard subsystem of claim 9 wherein the chain of states comprises 22 states for transferring an 11-bit frame, the frame including a start bit, 8 data bits, an odd parity bit, and a stop bit.

14. The keyboard subsystem of claim 9 further comprising:

a pointing device serial link between a pointing device and the keyboard controller logic device, the link including a serial clock line for synchronizing data transfer, a serial data line for transfer of one data bit per serial clock period, power and ground for energizing a controller within the pointing device, the pointing device serial link coupled to the detect means;

multiplexing means, coupled with the keyboard serial link and the pointing device serial link, responsive to the command logic for transmission and responsive to the detect means for receiving data, the multiplexing means selecting the serial clock and serial data from either the keyboard serial link or the pointing device serial link for coupling with the state machine means and the shift register means.

15. The keyboard subsystem of claim 8 wherein the Hot Reset output is pulsed low for about 6 microseconds in response to an "FE" Hex command being written into the first register.

16. A keyboard controller for communicating with a CPU in a system unit and for serially transferring data with a microcontroller within a keyboard enclosure having a key matrix with a plurality of key switches; the microcontroller for scanning the key matrix for pressed or released keys, the microcontroller generating a scan code to identify the key pressed or released; wherein the improvement comprises:

command logic means for communicating with the CPU and initiating a transmission of data to the keyboard;

a GateA20 output, responsive to the command logic means, for forcing a single address line from the CPU;

a Hot Reset output, responsive to the command logic means, for resetting only the CPU, the Hot Reset output pulsing in response to a specific command written by the CPU into the keyboard controller;

state machine means, responsive to the command logic means, for controlling the transfer of data between the keyboard controller logic device and the keyboard;

a serial link between the microcontroller within the keyboard enclosure and the keyboard controller, the link including a serial clock line for synchronizing data transfer, a serial data line for transfer of one data bit per serial clock period, and power and ground for energizing the microcontroller within the keyboard enclosure;

whereby data is transferred with the keyboard without a micro-programmed keyboard controller in the system unit.

17. The keyboard controller of claim 16 wherein the state machine means comprises:

idle state means, entered during a reset and upon completion of all serial transfers; and sequencing means, entered from the idle state means when receiving from the keyboard, the sequencing means sequencing when the serial clock changes polarity, one serial bit of data being transferred for every serial clock period.

18. The keyboard controller of claim 17 further comprising:

error state means, entered from the sequencing means when a time-out delay has elapsed.

19. The keyboard subsystem of claim 16 further comprising:

a pointing device serial link between a pointing device and the keyboard controller, the link including a serial clock line for synchronizing data transfer, a serial data line for transfer of one data bit per serial clock period, power and ground for energizing a controller within the pointing device; and multiplexing means, coupled with the keyboard serial link and the pointing device serial link, the multiplexing means selecting the serial clock and serial data from either the keyboard serial link or the pointing device serial link for coupling with the state machine means.

20. The keyboard subsystem of claim 16 wherein the Hot Reset output is pulsed low for about 6 microseconds in response to an "FE" Hex command being written into the keyboard controller.

* * * * *